United States Patent [19]

Sessa

[11] 4,191,060

[45] Mar. 4, 1980

[54] CAR SIDE WINDOW LIFTING MECHANISM

[76] Inventor: Terenzio Sessa, Via Albani 5, Varese, Italy

[21] Appl. No.: 859,546

[22] Filed: Dec. 12, 1977

[30] Foreign Application Priority Data

Mar. 31, 1977 [IT] Italy ............................... 21949 A/77

[51] Int. Cl.[2] ....................... F16H 29/02; E05F 11/48; F16D 67/00; B66D 3/16

[52] U.S. Cl. .................................. 74/89.22; 192/8 C; 49/352; 254/175.3

[58] Field of Search ............................. 74/89.2, 89.22; 192/8 C; 64/28 R; 49/352; 254/175.3

[56] References Cited

U.S. PATENT DOCUMENTS

| | | | |
|---|---|---|---|
| 1,770,087 | 7/1930 | Quick et al. | 49/352 X |
| 1,965,878 | 7/1934 | Briggs | 192/8 C |
| 2,001,758 | 5/1935 | Zwierzina | 192/8 C |
| 2,094,584 | 10/1937 | Cox | 64/28 R X |
| 4,026,071 | 5/1977 | Sessa | 49/352 |
| 4,110,935 | 9/1978 | Sessa | 49/352 |

FOREIGN PATENT DOCUMENTS

| | | | |
|---|---|---|---|
| 2215222 | 12/1972 | Fed. Rep. of Germany | 49/352 |

*Primary Examiner*—Lance Chandler
*Attorney, Agent, or Firm*—Shlesinger, Fitzsimmons & Shlesinger

[57] ABSTRACT

A car side window glass lifting mechanism is disclosed, in which the problem of pre-tensioning the operative wire in a mechanism of the single-shaft, wire-actuated type, is solved by the provision of a rupturable dowel properly located on the wire-winding drum. Means are also provided to stop the motion of a reducing gear which is intended for providing a correct relationship between the gearwheel of the gear in order to obtain a correct positioning of the active component parts as a function of the position of the glass window within its window frame.

10 Claims, 8 Drawing Figures

Fig.3
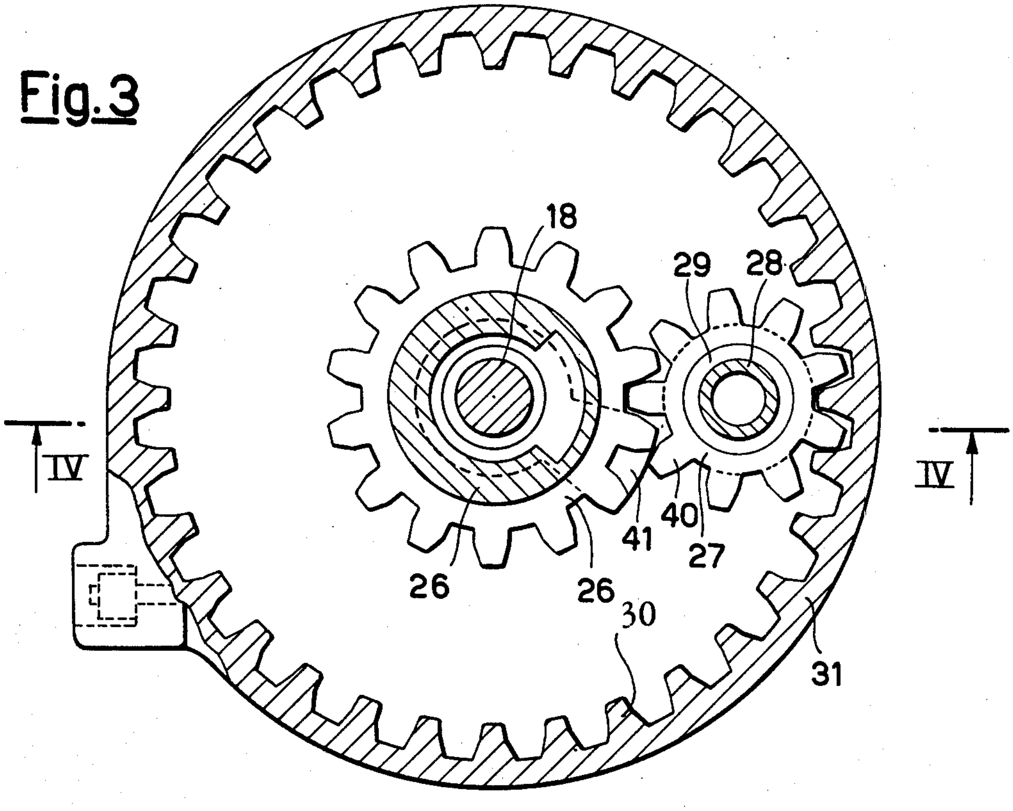
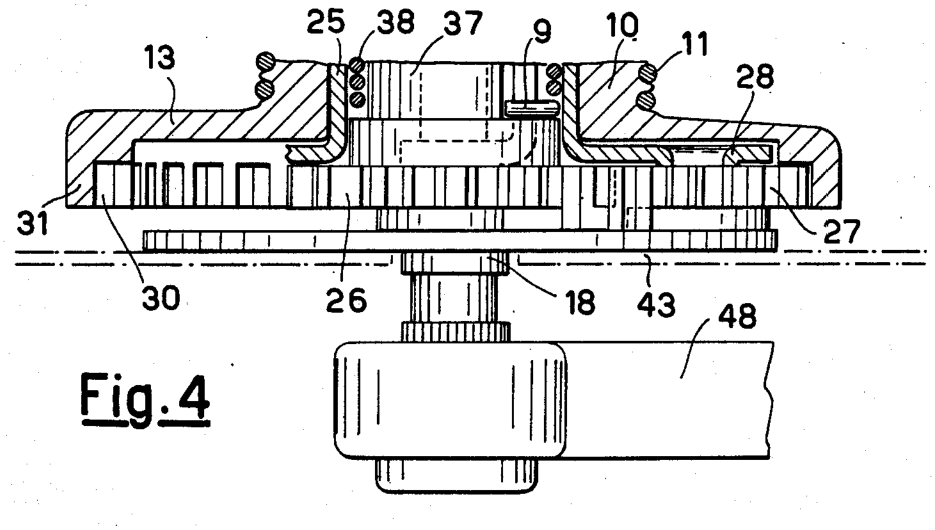
Fig.4

CAR SIDE WINDOW LIFTING MECHANISM

This invention relates to a few advantageous improvements in or relating to a wire-controlled car side window lifting mechanism of the kind called the single-shaft type which permits a correct adjustment of the tension of the cable, more particularly when the lifting mechanism for the glass of a car side window.

A car side window glass lifting mechanism of this kind is, for example, the one disclosed in the U.S. Pat. No. 4,026,071 by the same applicant hereof and to which reference is invited whenever further elucidations become necessary.

In a lifting mechanism of this kind, the mechanism which permits an accurate tensioning of the cable is obtained by connecting by the agency of a unidirectional clutch, for example a front dog clutch, the drum on which the cable is wound, with a wheel which at least partally crenellated, the latter being rotatably driven so as to rotate about the same shaft of the drum. The two ends of the cable are connected, respectively, to such drum and such wheel, which are maintained in mutual engagement by a leaf spring which is fastened to either end of said shaft and is active upon the outer surface of the crenellated wheel. The tensioning of the cable is achieved by means of a dynamometric key by acting from the outside of the car door in a convenient position. More exactly, such a dynamometric spanner comprises a handle-crank which, through the intermediary of a conventional stress-limiting device, controls the rotation of an output shaft, to the end of which is keyed a pinion which is adapted to come into mesh with the crenellated wheel aforesaid as matched to the wire-winding drum. In the casing of the spanner, in addition, a bore is formed which is adapted to be inserted onto the drum shaft which projects from the door and such bore is so arranged as to make sure that the output shaft of the spanner, by passing through an opening of the door, brings its pinion exactly to mesh the teeth of the crenellated wheel which is matched to the drum. By rotating the crank until it transfers through the stress-limiting calibrated device the increasing torque applied by an operator, the tension of the cable can be adjusted.

It will thus be understood that the output shaft of the dynamometric spanner in operation becomes parallel to the drum shaft in a position which entirely outside of the total width span of the glass-lifting mechanism.

Under these conditions, the crenellated wheel coupled to the drum must have, to be correctly engaged by the pinion of the dynamometric spanner output shaft, a diameter which is comparatively larger than the drum diameter.

This oversizing of the device, even though it might be acceptable in a few car types, is undesirable for other cars since it can interfere with other component parts of the glass moving mechanism in the door.

An object of the present invention is thus to solve this technical problem by providing a glass-lifting mechanism of the kind referred to above, of the single-shaft type and having a tensioning device incorporated therein, in which the diameter of the crenellated wheel coupled to the drum through the unidirectional clutch does not exceed the drum diameter, even permitting that the wire-tensioning is effected from outside the door.

To dispense with such an undesirable oversizing of the crenellated wheel of the unidirectional clutch, it has been thought how was it possible to adjust the angular position of the crenellated wheel relative to the drum from the outside of the car door without using a dynamometric spanner of the kind referred to above.

The power input which is immediately available is the drum shaft which is rotated by the control crank of the glass-lifting mechanism.

According to the invention, it has been envisaged, consequently, to exploit such a shaft as the rotation control member of both the drum and the wheel of the one-way clutch which is matched to the shaft, so as simultaneously to rotate with it, by a rupturable dowel which is intended to break as a preselected torque value is exceeded, such dowel engaging the above mentioned leaf spring fastened to the shaft end and which is intended to maintain a mutual engagement between such wheel and such drum.

However, since for regulating the wire tension it is necessary to adjust the mutual angular positions of the wheel and the drum, it is preferred, even though this measure is not vital as itself, that, to the rotation of the drum shaft, and thus of the wheel, in a direction, for a certain number of revolutions, there corresponds a rotation of the drum itself in the opposite direction and for a different number of revolutions. This is made in order to be able to effect the wire tensioning with a limited crank rotation.

The situation being such, it has been thought to connect the shaft and the drum, rather than directly as is conventionally made, by the agency of a reducing gear train which cause the drum to be rotated in a direction opposite to the control shaft and for a number of revolution which is smaller than that made by the control shaft, and thus smaller than that of the wheel of the one-way clutch connected to said shaft by means of both the spring and the rupturable dowel.

It is thus apparent that, according to this invention, the wire tension can be adjusted from the outside of the car door by having the glass-lifting mechanism shaft rotated until the rupturable dowel is broken. Of course, the mutual rotation between the drum and the wheel during the tensioning step of the wire takes place in the direction of disengagement of the one-way clutch between the drum and the wheel aforesaid.

The dynamometric spanner referred to above can thus be dispensed with and, thereby, the necessity of making the clutch wheel toothed and with a diameter larger than the drum diameter is suppressed.

It should be noted, moreover, that the linkage for reducing the rotation between the control shaft and the wire-winding drum has been embodied also in order to enable to lift with a slight force glasses which are comparatively heavy and which are disturbing if they must be lifted with the conventional single-shaft lifters.

Another very important improvement afforded by the presence of the gear train of reduction aforesaid is the provision, directly on the gears of the train, of end of stroke abutments for the rotation of the drum which corresponds to the lowered glass position, instead of the conventional end of stroke abutments having the form of disc packs, such as those disclosed in the German published application No. 1 708 164. To have removed such a disc pack from the end of stroke abutments makes the manufacture of the mechanism much cheaper, as can easily be understood.

The structural and functional features of the device according to this invention and its advantages over the prior art will become still clearer from the scrutiny of the ensuing exemplary description, aided by the accompanying drawings, wherein:

FIG. 3 is a cross-sectional view taken along the line III—III of FIG. 1.

FIG. 4 is a cross-sectional view taken along the line IV—IV of FIG. 3.

Figure 1:
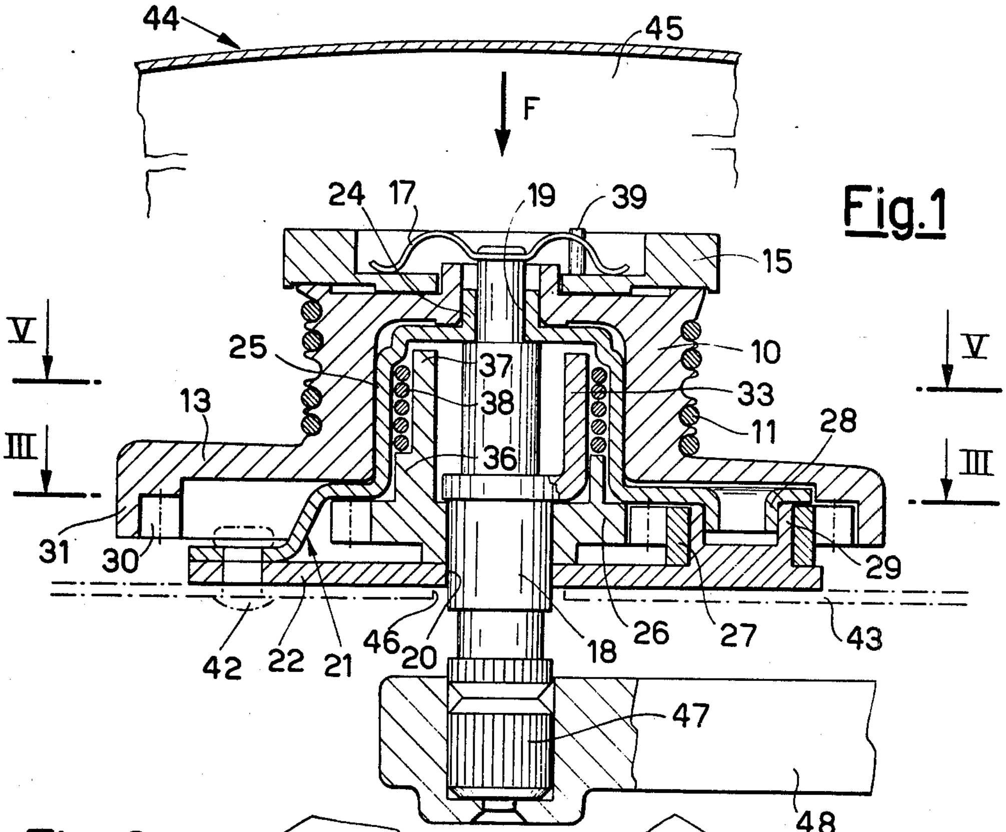
FIG. 1 is a cross-sectional view, taken along the line I—I of FIG. 2, which is illustrative of a glass-lifting mechanism constructed according to this invention.
Figure 2:
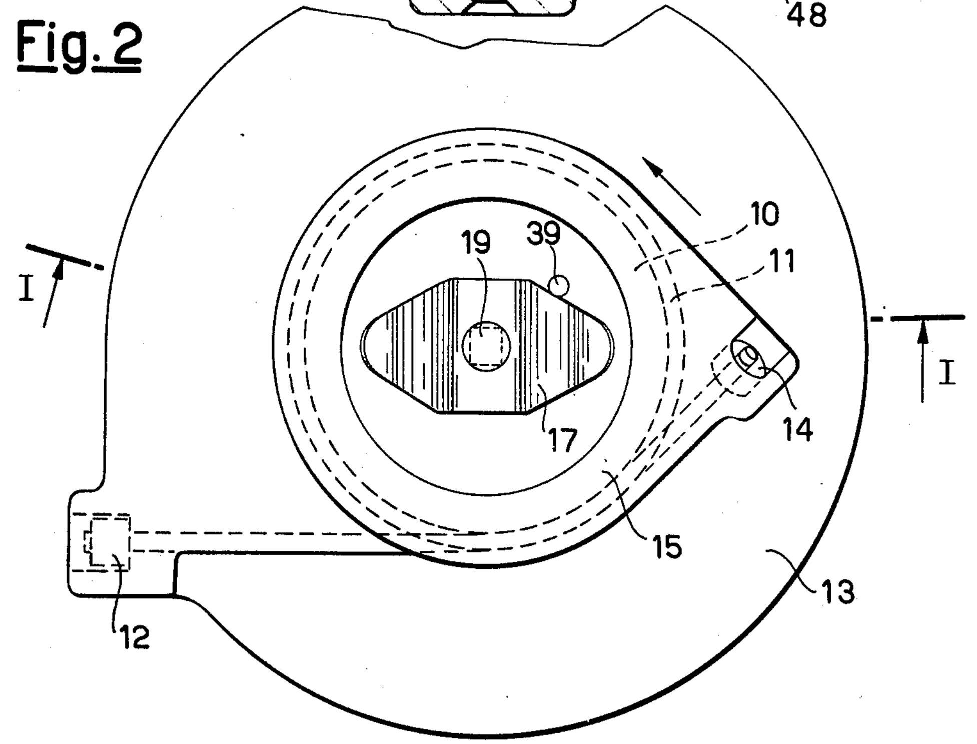
FIG. 2 is a view taken along the arrow F of FIG. 1.
Figure 7:
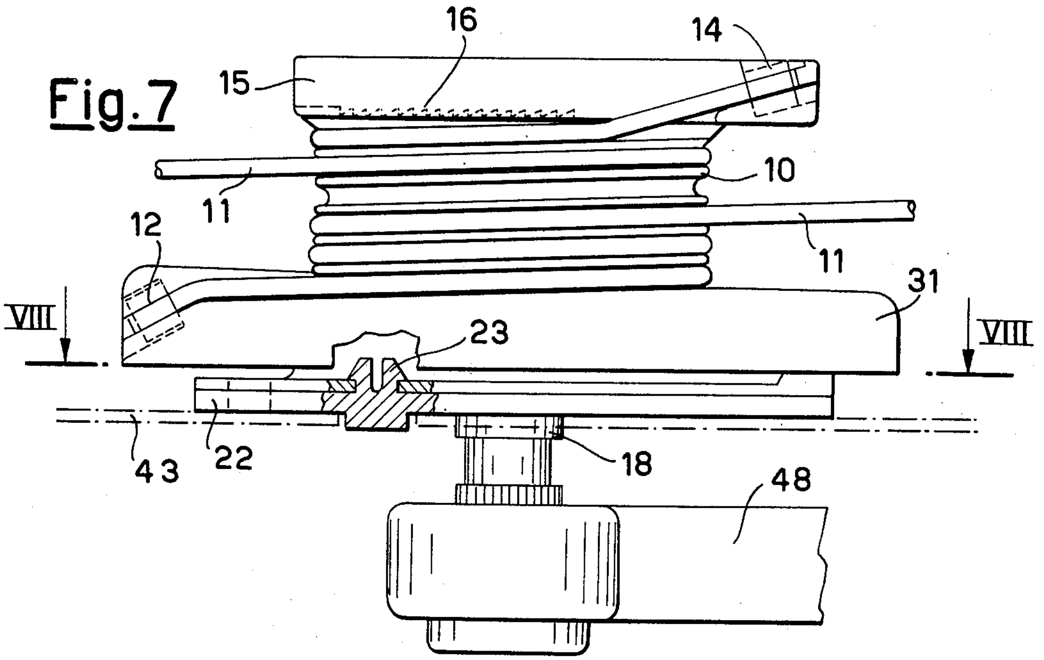
FIG. 7 is a side-elevational view, partly in cross-section, which shows the same glass-lifting device.

By having now reference, at the outset, to FIGS. 1, 2 and 7 of the drawings, they show a wire-controlled glass-lifter, of the single-shaft type, and with a wire-tensioner incorporated therein, it being intended with the term "single-shaft" a glass-lifter in which the control crank is coaxial with the axle of the wire-takeup drum.

The glass lifter comprises a grooved drum 10 on which a wire 11 is wound and from which is paid off, which has an end fastened at 12 to a flange 13 of the drum, while the opposite end is fastened at 14 to a wheel 15 which is operatively connected to the drum 10 by a one-way front dog clutch having saw-toothed dogs 16 (FIG. 7). A leaf spring 17 fastened to the inner end of the shaft 18 which controls the device, urges the wheel 15 into operative contact with the drum 10. A glass lifting mechanism of this kind is disclosed for example in the above U.S. patent specification aforementioned. Lifting and lowering of the glass (not shown in order not to overcrowd the drawings) take place quite conventionally since the bottom edge of the glass is fastened to the laps of the wire 11 which, during the rotation of the drum, are wound around and paid off from the drum, respectively.

Of course, the two branches of the wire 11 are guided by idle pulleys so as to exhibit vertical parallel opposite sections to which the bottom edge of the glass can conveniently be affixed. A wire route in a wire-actuated glass lifter is shown for example, in the U.S. patent application Ser. No. 848,880 filed on Nov. 7, 1977, now U.S. Pat. No. 4,110,935 by the same applicant hereof.

Figure 8:
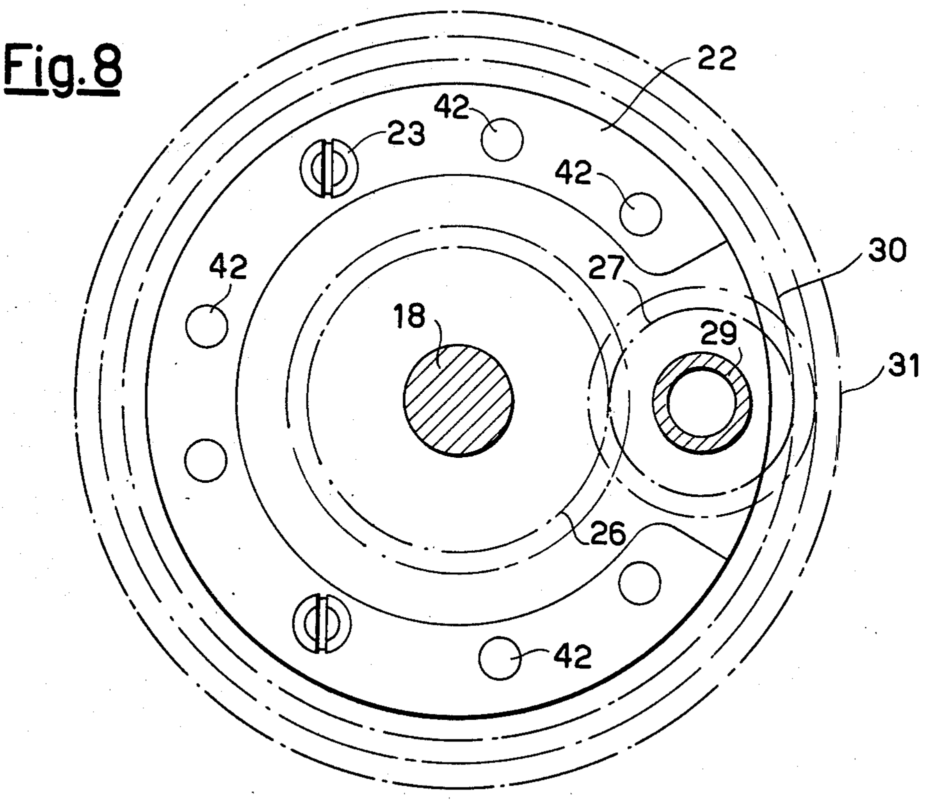
FIG. 8 is a cross-sectional view taken along the line VIII—VIII of FIG. 7.

Quite characteristically, the control shaft 18 is mounted for rotation on two coaxial hubs 19, 20 formed, respectively, on a stamped cuplike member 21 and on a lid 22 which is applied by snap buttons 23 to the cuplike member 21 aforesaid (FIGS. 1, 7 AND 8).

The rotation of the drum 10 is guided by the cuplike member 21 through the outer cylindrical casing 24 of the same hub 19 and, through a cylindrical hood 25 coaxial with 24 and having a larger diameter than 24 (FIG. 1).

The operative connection between the shaft 18 and the drum 10 is, according to this invention, embodied by a train of reducing gears which comprises: a gear 26 mounted on the same shaft 18, an idle intermediary gear 27 which rotates about a pin which is formed by the mutual match of embossments 28, 29, respectively, of the cuplike member 21 and of the lid 22, and a ring gear 30 which is formed internally on an annular bead 31 of the flange 13 of the drum 10 (FIGS. 1, 3 and 4).

Figure 6:
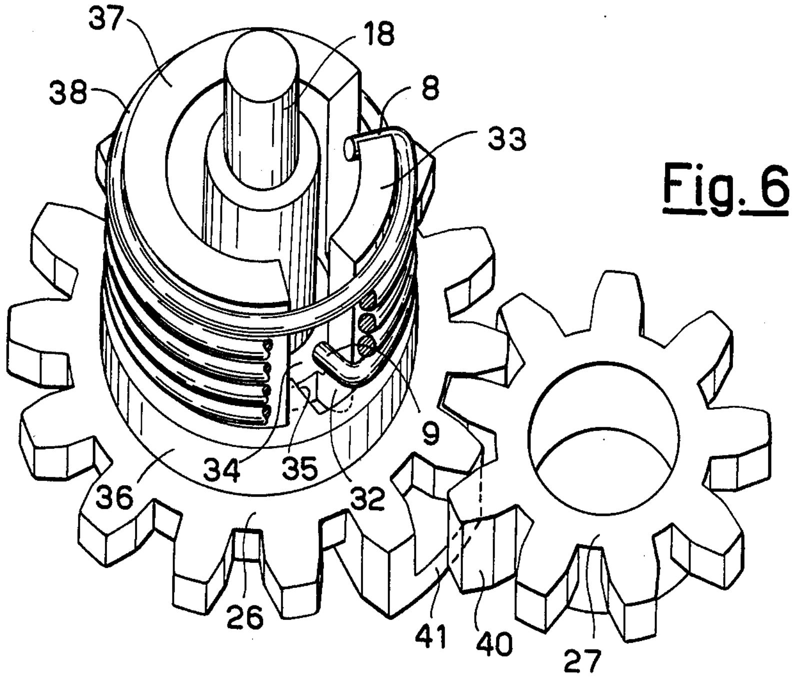
FIG. 6 is an axonometric view of a few component parts of the device.

The operational connection between the shaft 18 and the gear 26 is obtained by the radial root 32 of an arm 33 which extends axially out of a base ring 34 fastened to the shaft 18 (FIG. 6).

Figure 5:
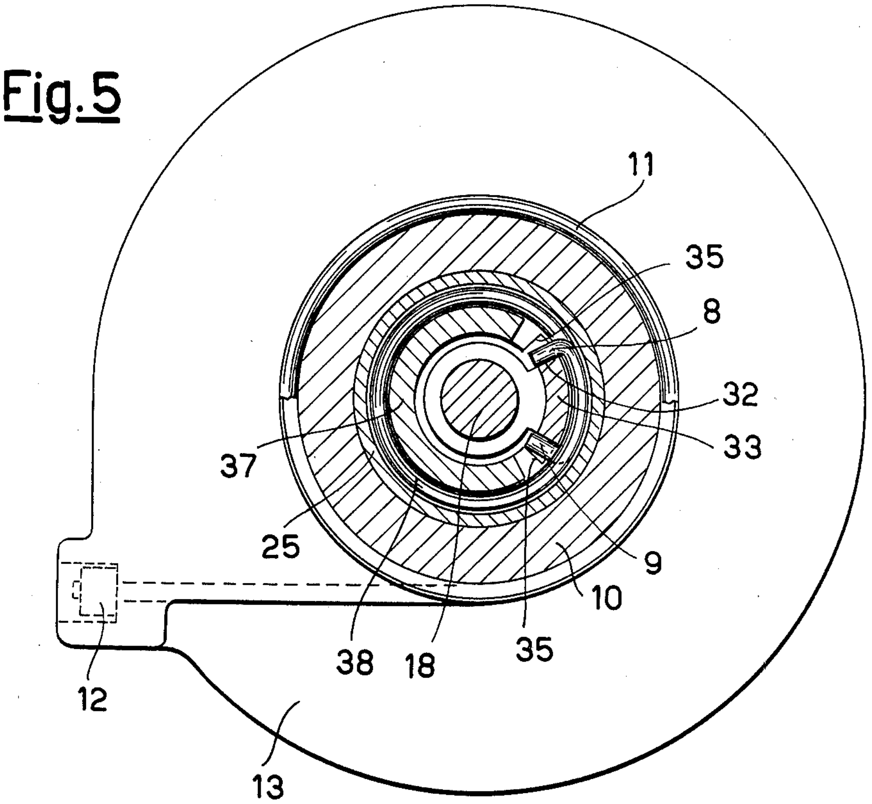
FIG. 5 is a cross-sectional view taken along the line V—V of FIG. 1.

The root 32 acts, when the shaft 18 is rotated either clockwise or anticlockwise, against respective abutments 35 (FIGS. 5 and 6) of an embossment 36 integral with the gear 26. The boss 36 has, moreover, integral therewith, a partially cylindrical hood 37 on which a braking spring 38 is mounted, which has the curled-in arms 8 and 9 fastened to opposite edges of the arm 33.

The spring 38 is a conventional braking spring which, by acting upon the inner surface of the uplike member 25, is intended for preventing a forced depression of the window glass by pushing the top edge thereof downward.

In addition, according to the present invention, the shaft 18 is operatively connected to the wheel 15 by the radial spring 17 which, by being rotated, engages a rupturable dowel 39 which is broken as a force exceeding a preselected level is applied thereto and which extends eccentrically from the wheel 15.

The task of such a connection will be explained in detail hereinafter.

Another feature of the invention is the provision, on the reducing gear train, of means which limit the number of revolutions of the drum 10 exactly to the fully-lowered-glass position.

Such end of stroke abutments are clearly seen in FIGS. 3, 4 and 6 of the drawings. They comprise, merely, a longer tooth 40 on the idle gear 27, such tooth abutting an embossment 41 between two ajoining teeth of the gear 26. It is apparent that, starting from the position depicted in FIGS. 3 and 6 of the drawings, which substantially correspond, for instance, to the fully raised position of the window glass, by rotating the gear 26 clockwise, the tooth 40 and the embossment 41 will abut substantially with interference, only after nine revolutions of the gear 26 and fourteen revolutions of the idling gear 27, at a position which is the mirror image of that shown in FIGS. 3 and 6. As a matter of fact, in the example shown, the gear and the idle gear have fourteen and nine teeth, respectively.

It is now apparent that in the intermediate positions between the extreme positions of interference referred to above, the longer tooth 40 and also the other teeth of the idling gear 27 can mesh without any hindrance with the teeth of the gear 26. The boss 41 lies and rotates on a plane beneath the plane of the shorter teeth of the idling gear 27.

Such end of stroke abutment can work in both directions of rotation of the drum but, in actual practice, it is exploited only to determine the end of stroke position of the lowered glass since the fully raised glass position is determined, quite conventionally, by the window ledge itself.

Thus, in the position shown in FIG. 6, the tooth 40 and the boss 41 are only about to become abutting since the rotation of the gear 26 is already impeded by the fully lifted glass which has reached the top window ledge.

When used in the motor car industry, the device according to the invention is riveted by rivets 42 to the inner panel 43 of a car door 44. The device is thus sandwiched within the space 45 of the door 44, with its control shaft 18 extending within the car interior by passing through a bore 46 of the panel 43. The shaft 18 has a splined head 47 onto which a manipulating crank 48 is keyed.

Once the device has been mounted in this manner, the tensioning of the wire 11 takes place as follows.

Let it be assumed to look at the device in the direction of the arrow F of FIG. 1. The operator, by actuating the crank 48, causes the shaft 18 to be rotated counterclockwise, whereafter, through the spring 17 and the dowel 39 causes the wheel 15 (FIGS. 2 and 7) to be rotated in the same direction so that the wheel is angularly shifted relative to the drum 10: the latter is meanwhile rotated in the opposite direction and at a speed different from that of the reducing gear train 26, 27 and 30. Thus, a gradual tightening of the wire 11 is obtained and, as soon as the stress transferred thereby exceeds a preselected magnitude, the continued forced rotation of the crank by the operator breaks the rupturable dowel 39 and thus the release of the connection of rotation between the shaft 18 and the wheel 15. The wheel 15, consequently, is rotated in unison with the drum 10 for the correct operation of the glass lifting mechanism as a whole. Of course, the rupturable dowel 39 will be sized so as to break under a preselected pull that it is desired to impress to the wire 11.

The wire-actuated glass lifting mechanism of this invention, of the single-shaft type and with incorporated tensioning device has thus such a structure as not to require any ancilliary tool for pre-tensioning the wire, and permits that even very heavy glass plates may be lifted easily by the facility of the gear train while concurrently providing on such train stroke-restricting means which define the fully lowered position of the glass.

While a possible embodiment of the invention has been described and shown herein, be it understood that modifications and changes can be introduced therein without departing from the scope of this invention.

For example, the dowel 39, instead of with the spring 17, could co-operate with a projection extending from the hub 19. If so, the rotation of the wheel 15 would immediately be stopped and the tensioning of the wire would take place merely by the instrumentality of the rotation of the drum 10 relative to the wheel 15 itself.

The scope of the invention is thus limited by the appended claims only.

I claim:

1. A wire-actuated car side window lifting mechanism, more particularly for motor cars, of the single-shaft control type having incorporated therein a wire-tensioning device comprising a wire-winding drum, a first grasping member for either end of the wire, integral with the drum and a second fastening member for the other end of the wire connected to the drum with a one-way clutch which permits the mutual sliding between said drum and said second fastening member, characterized in that the control shaft is connected to the drum via a reducing gear train and to the second fastening member via an automatically releasable mechanical linkage which is released as the stress impressed to the wire exceeds a preselected magnitude.

2. A device according to claim 1, characterized in that said second fastening member is a wheel coaxial with the drum, and in that said mechanical linkage is formed by a rupturable dowel eccentrically projecting from the outer surface of the wheel, the dowel engaging a member affixed radially to the end of the control shaft which protrudes from the wheel by a small length.

3. A device according to claim 2, characterized in that said member is a leaf spring which urges the wheel into operative contact with the drum.

4. A device according to claim 1, characterized in that said reducing gear train is composed by a gear fastened for rotation to the control shaft, a ring gear formed internally on an edge of a flange integral with the drum and an idle gear which connects said gear and said ring gear.

5. A device according to claim 4, characterized in that latching means are provided for preventing the meshing and thus the rotation of the idle gear either with said gear or with said ring gear after a preselected number of revolutions.

6. A device according to claim 5, characterized in that said latching means are formed by two abutments integral with said gear and with said idle gear, which abut with interference after a preselected number of revolutions.

7. A device according to claim 6, characterized in that said two abutments are formed by a tooth of the idle gear which is longer that the other teeth and by an embossment of the gear which is in confronting position relative to the extension of the tooth of the idle gear.

8. A device according to claim 1, characterized in that said shaft is mounted for rotation on two coaxial hubs of a stamped cuplike member and a lid of said cuplike member, respectively, in that said drum is supported for rotation coaxially with said shaft on two cylindrical sections of different diameters of said cuplike member and in that at least one gear of said reducing gear train is mounted on a pin formed by matching two peripheral projections of said cuplike member and said lid.

9. A device according to claim 8, characterized in that said lid is snappingly applied onto an annular flange of said cup-like member.

10. A glass-lifting wire-actuated mechanism, more particularly for automotive vehicles, of the single-shaft controlled type having incorporated therein a wire-tensioning mechanism comprising a wire-winding drum, a first fastening member for securing either wire end integral with the drum and a second fastening member for securing the other wire and connected to the drum by a one-way clutch which allows a mutual sliding motion between said drum and said second fastening member, characterized in that said second fastening member is connected to a stationary component part of the device through a mechanical linkage which is automatically released as a preselected stress is impressed to the wire.

* * * * *